United States Patent
Mao et al.

(10) Patent No.: US 10,153,681 B2
(45) Date of Patent: Dec. 11, 2018

(54) LINEAR VIBRATION MOTOR

(71) Applicants: LuBin Mao, Shenzhen (CN); Shun Guo, Shenzhen (CN); HongXing Wang, Shenzhen (CN)

(72) Inventors: LuBin Mao, Shenzhen (CN); Shun Guo, Shenzhen (CN); HongXing Wang, Shenzhen (CN)

(73) Assignee: AAC TECHNOLOGIES PTE. LTD., Singapore (SG)

( * ) Notice: Subject to any disclaimer, the term of this patent is extended or adjusted under 35 U.S.C. 154(b) by 405 days.

(21) Appl. No.: 14/928,373

(22) Filed: Oct. 30, 2015

(65) Prior Publication Data

US 2016/0226358 A1  Aug. 4, 2016

(30) Foreign Application Priority Data

Feb. 2, 2015 (CN) .......................... 2015 1 0054443

(51) Int. Cl.
 *H02K 33/16* (2006.01)
(52) U.S. Cl.
 CPC .................................... *H02K 33/16* (2013.01)
(58) Field of Classification Search
 CPC ................................. H02K 33/16; H02K 7/09
 USPC ........................................ 310/25, 90.5, 12.31
 See application file for complete search history.

(56) References Cited

U.S. PATENT DOCUMENTS

| 4,693,130 A | * | 9/1987 | Kotzur | F16C 32/044 475/153 |
| 6,249,367 B1 | * | 6/2001 | Hirose | G02B 7/1821 359/199.3 |
| 6,658,083 B2 | * | 12/2003 | Sai | F16C 13/04 378/34 |
| 8,680,723 B2 | * | 3/2014 | Subramanian | H02K 33/06 310/12.01 |
| 2003/0173834 A1 | * | 9/2003 | McGill | F04B 35/045 310/12.19 |
| 2009/0096302 A1 | * | 4/2009 | Barada | F16C 32/0448 310/90.5 |
| 2010/0109448 A1 | * | 5/2010 | Mamba | H02K 41/033 310/12.17 |
| 2012/0146557 A1 | * | 6/2012 | Pyo | G11B 5/1278 318/129 |
| 2012/0169148 A1 | * | 7/2012 | Kim | H02K 33/16 310/25 |
| 2012/0227269 A1 | * | 9/2012 | Subramanian | B26B 19/282 30/210 |
| 2014/0306556 A1 | * | 10/2014 | Kim | H02K 33/00 310/25 |
| 2015/0137624 A1 | * | 5/2015 | Wu | H02K 41/031 310/12.05 |

(Continued)

*Primary Examiner* — Forrest M Phillips
(74) *Attorney, Agent, or Firm* — Na Xu; IPro, PLLC

(57) ABSTRACT

A linear vibration motor includes a housing, a PCB at least partially covered by the housing, a sliding pair, a vibrator suspended in the housing by the sliding pair, the vibrator including a plurality of holes in a middle portion thereof for receiving a magnet assembly, a driving coil assembly located on the lid and facing the magnet assembly for actuating the magnet assembly oscillate along a direction paralleled to the bottom wall of the crust, a pair of gas springs separately located at two ends of the vibrator for providing a constantly and alternatively restoring force to vibrator for oscillating freely.

8 Claims, 2 Drawing Sheets

(56) References Cited

U.S. PATENT DOCUMENTS

2015/0280537 A1\* 10/2015 Nishiura ............ A61C 17/3445
15/22.2

\* cited by examiner

LINEAR VIBRATION MOTOR

RELATED PATENT APPLICATION

This application claims the priority benefit of Chinese Patent Application Filing Serial Number CN 201510054443.3, filed on Feb. 2, 2015, the disclosure of which is herein incorporated by reference in its entirety.

FIELD OF THE INVENTION

The present disclosure relates to the art of vibrating motors, and particularly to a linear vibrating motor for improving elastic fatigue damage.

DESCRIPTION OF RELATED ART

Consumer products, such as mobile phones and portable multi-media players, generally include vibrators for generating tactile feedback. For example, a vibration motor is very similar to the device that makes your cellphone shake when you get a text. With this module, you can make anything vibrate and buzz.

Generally, a linear vibrating motor comprises a cover, a base forming a receiving cavity together with the cover, a coil located on the base, an elastic member coupled to the base, a vibrating unit suspended in the receiving cavity by the elastic member. The vibrating unit typically includes a magnet and a weight attached to the magnet. The coil is positioned right below the magnet.

The elastic member comprises an arm and a pair of splints extending from the arm, and the splints attach to the vibrating unit for suspend the vibrating unit in the cavity. As the arm and the splints are integrated formed with complex structures, it is not convenient to manufacture such an elastic member. And, during the vibration of the vibrating unit, the arm will be given great stresses, which shorten the circle life of the elastic member.

In view of the above-described situation, it is necessary to provide an improved flat linear vibrating motor for solving the problems mentioned above.

BRIEF DESCRIPTION OF THE DRAWINGS

Many aspects of the embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION OF THE EMBODIMENT

Reference will now be made to describe exemplary embodiment of the present disclosure in detail.

Figure 1:
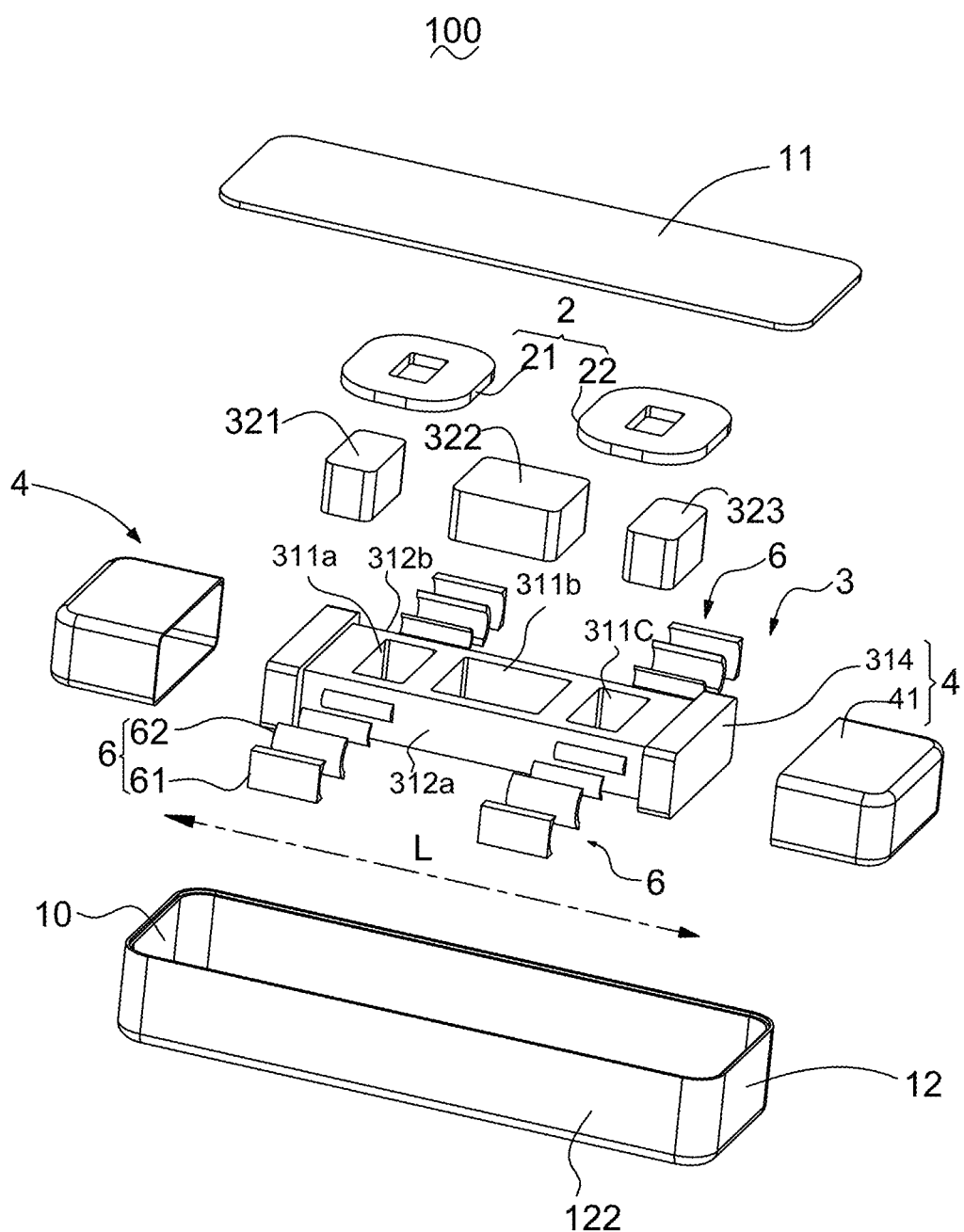
FIG. 1 is an isometric exploded view of a linear vibrating motor in accordance with an exemplary embodiment of the present invention.
Figure 2:
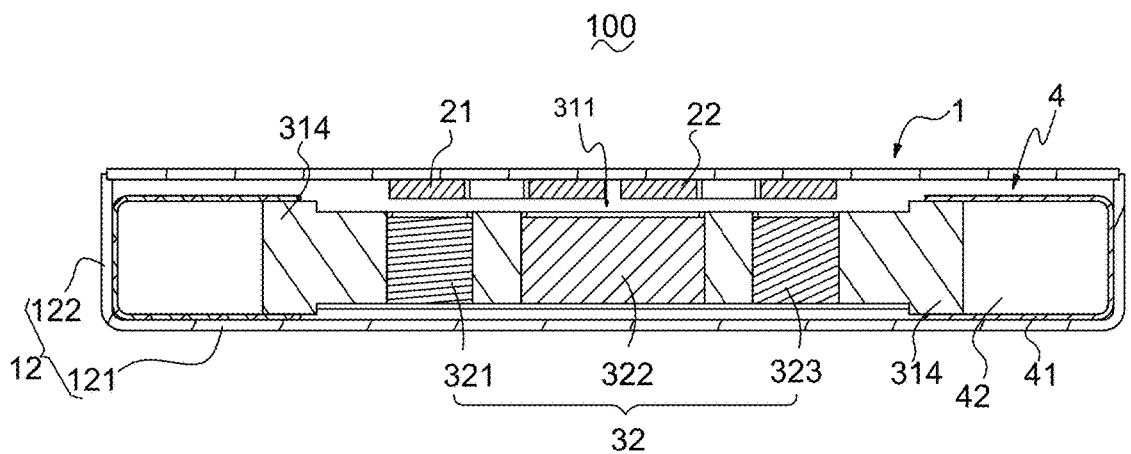
FIG. 2 is a schematic cross-sectional view of the linear vibrating motor in FIG. 1.
Figure 3:
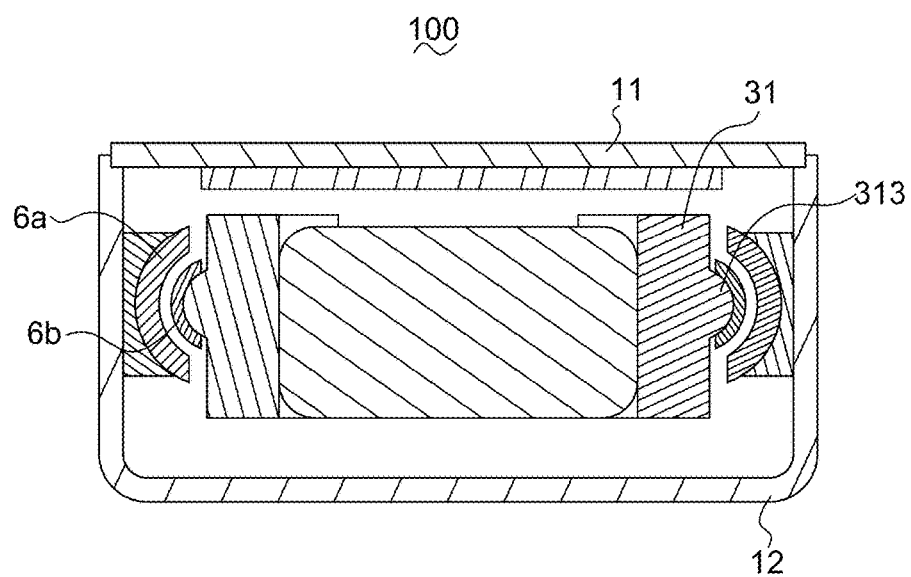
FIG. 3 is a schematic cross-sectional view of the linear vibrating motor in FIG. 1, from another aspect.

Referring to FIGS. 1 through 3, a linear motor 100, in accordance with an exemplary embodiment of the present invention, includes a lid 11, a crust 12 forming a housing 1 having a receiving space 10 together with the lid 11, a sliding pair 6, a vibrator 3 having a magnet assembly 32 that is suspended by the sliding pair 6 in the receiving space 10, a gas spring 4 and a driving coil assembly 2 located on the lid 11 and facing the magnet assembly 32 for actuating the magnet assembly 32 oscillate along a lengthwise direction L paralleled to the crust 12 so that the vibrator 3 may be oscillated synchronously. In additional, the linear vibrator 100 further includes a PCB for proving electrical signals to the magnet assembly 32. Even though, the PCB is not illustrated in the drawings, the PCB is necessary component to manufacture a finished linear motor.

In the embodiment, the crust 12 is configured to be a cuboid shape and includes a bottom wall 121 and a plurality of sidewalls 122 extending vertically from the bottom wall 121. The lid 11 is attached to the sidewalls 122 for forming the rectangular housing for accommodating various kinds of components.

The vibrator 3 includes a body 31 in shape of straight bar for accommodating the crust 12, a plurality of holes 311 separately is provided in the body 31 of the vibrator 3 for receiving the magnet assembly 32. The plurality of holes 311 has a first hole 311a, a second hole 311b and a third hole 311c in sequence along the lengthwise direction L paralleled to lengthwise side of body 31. Accordingly, the magnet assembly 32 has three magnets 321-323 corresponding to the three holes 311a-311c. Each the three magnets have magnetic poles opposite to those of adjacent magnet. The driving coil assembly 2 has a first coil 21 and a second coil 22 for forming two magnetism-guided loops corporately with the three magnets 321-323. Along a lengthwise direction L of the vibrator 3, the vibrator 3 has a first lengthwise side 312a facing the sidewalls 122 of the crust 12, a second lengthwise side 312b opposite to the first lengthwise side 312a. The sliding pair 6 has a first sliding pair 61 mounted on the crust, and a second sliding pair separately mounted on the first lengthwise side 312a and the second lengthwise side 312b. The first sliding pair 61 and the second pair 62 corporately forming a configuration based on the electromagnetic levitation theory for supporting the vibrator 3. The term "support" here means to hold something firmly or bear its weight via non-entity contact manner without any directly touch like a hinge. As shown in FIG. 1, the present disclosure provides four sliding pairs separately designed on the both sides of the vibrator 4 for supporting firmly. FIG. 1 illustrates only four sliding pairs, but, the amount of the sliding pairs are not limited to four, and may be adjusted according to actual requirement.

Specifically, the first sliding pair 61 has a first magnet 6a mounted on the sidewall 122 of the crust 12, and the second sliding pair 62 has a second magnet 6b mounted on lengthwise side of the vibrator 3 right facing the first magnet 6a for readily suspending the vibrator 3 in the housing 1 via like poles repel each other. Furthermore, a protrusion 313 extends from the first and second lengthwise sides 312a-312b of the vibrator 3, respectively. The second magnet 6b is configured to a plate in shape of arc which is mounted on the protrusion 313. The first magnet 6a has a surface configured to an arc for providing a sufficient magnetic repulsive surface to the second magnet 6b so as to support the vibrator 3 firmly. The shape of the second magnet 6b is not restricted to a half-arc plate as described in the embodiment. Alternatively, the first magnet may be a magnetic groove designed in the sidewall 122 of crust 12 corresponding to the second magnet and just the first magnet 6a totally surrounds the second magnet 6b.

In the embodiment, the gas spring 4 is formed by virtue of the cooperation between two ends 314 of the vibrator 3 along the vibration direction of the vibrator (lengthwise direction L) severs as two pistons and a pair of gas cylinders 41. The gas cylinders 41 includes a compression volume 42 and an opening facing the vibrator 3, the two ends 314 of the vibrator 3 insert into the compression volume 42 and seal the opening. The compression volume 42 contains a suitable working gas such as air, helium. In embodiment, the piston slides within a portion of the gas cylinder 41. Namely, the piston 314 performs reciprocating linear movement with a certain stroke in the compression volume 42 of the gas cylinder 41. When the piston is reciprocating within the gas cylinder 41, oscillating pressure in the gas cylinder 41 is created responding to compressibility compression ratio of gas so as to force the vibrator 3 relative to the housing 1 to freely oscillate.

In summary, in the present embodiment the linear motor 100 provides the pair of gas spring 4 for providing a restoring force to vibrator 3 along the lengthwise direction L. When the driving coil assembly 2 is electrified, the vibrator 3 is forced to move along a direction parallel to the bottom wall 121 of the crust 12 by the electro-magnetic force, i.e., the Lorentz force. During vibration, the compression volume 42 of the gas spring 4 is constantly and alternatively compressed and stretched. Compared with the related art, even though the vibration amplitude exceeds the maximum elastic deformation of a mechanical spring, the gas spring 4 would not be mechanical fatigued.

While the present invention has been described with reference to a specific embodiment, the description of the invention is illustrative and is not to be construed as limiting the invention. Various of modifications to the present invention can be made to the exemplary embodiment by those skilled in the art without departing from the true spirit and scope of the invention as defined by the appended claims.

What is claimed is:

1. A linear vibration motor, comprising:

A lid;

A crust forming a housing together with the lid, the crust having a bottom wall and a plurality of sidewalls extending upwardly and perpendicularly from the bottom wall, A PCB at least partially covered by the housing;

A sliding par configured to a configuration based on the electromagnetic levitation theory, A vibrator suspended in the housing by the sliding pair, the vibrator including a plurality of holes in a middle portion thereof for receiving a magnet assembly having three magnets;

A driving coil assembly located on the lid and facing the magnet assembly for actuating the magnet assembly to oscillate along a direction parallel to the bottom wall of the crust;

A pair of gas springs separately located at two ends of the vibrator for providing a constant and alternate restoring force to the vibrator for free oscillation wherein:

The gas springs are formed by virtue of the cooperation between two ends of the vibrator along the vibration direction of the vibrator serving as two pistons and a pair of gas cylinders, the gas cylinders include a compression volume and an opening facing the vibrator, the two ends of the vibrator insert into the compression volume and seal the opening, when the vibrator oscillates in the housing, the two ends of the vibrator reciprocate within the gas cylinder, oscillating pressure in the gas cylinder is created corresponding to a compressibility compression ratio of gas sealed in the compression volume so as to force the vibrator relative to the housing to freely oscillate.

2. The linear vibration motor as described in claim 1, wherein the vibrator includes a body in shape of straight bar having a first lengthwise side facing the sidewall of the crust, and a second lengthwise side opposite to the first lengthwise side.

3. The linear vibration motor as described in claim 2, wherein the sliding pair has a first sliding pair mounted on the sidewall of crust, and a second sliding pair mounted on the first and second lengthwise side of the vibrator and facing corresponding to first sliding pair corporately forming a configuration based on the electromagnetic levitation theory.

4. The linear vibration motor as described in claim 3, wherein a protrusion is extending from the first and second lengthwise sides of the vibrator, respectively, and the second sliding pair has a second magnet configured to a plate in shape of arc which is mounted on the protrusion.

5. The linear vibration motor as described in claim 4, wherein the first sliding pair has a first magnet having a surface configured to an arc for providing a sufficient magnetic repulsive surface facing the second magnet of the second sliding pair.

6. The linear vibration motor as described in claim 5, wherein the driving coil assembly has a first coil and a second coil for forming two magnetism-guided loops corporately with the three magnets.

7. The linear vibration motor as described in claim 6, wherein the compression volume contains a suitable working gas such as air or helium.

8. An electronic terminal device, comprising the linear vibration motor of claim 1.

* * * * *